United States Patent
Kennedy, Jr.

[11] Patent Number: 4,469,469
[45] Date of Patent: Sep. 4, 1984

[54] PROTECTIVE SYSTEM FOR UNDERGROUND PIPES

[75] Inventor: Ted Kennedy, Jr., Ann Arbor, Mich.

[73] Assignee: The Trenton Corporation, Ann Arbor, Mich.

[21] Appl. No.: 417,400

[22] Filed: Sep. 13, 1982

[51] Int. Cl.³ .......................... F16L 1/02; F16L 58/12
[52] U.S. Cl. ............................ 405/157; 138/DIG. 6; 405/184
[58] Field of Search ............... 405/154, 157, 179, 184; 138/105, DIG. 6

[56] References Cited

U.S. PATENT DOCUMENTS

| | | | |
|---|---|---|---|
| 1,792,855 | 2/1931 | McRae | 405/157 X |
| 2,007,969 | 7/1935 | Grodsky | 405/157 |
| 3,582,533 | 6/1971 | Albright et al. | 405/157 X |
| 3,655,564 | 4/1972 | Barrington | 405/157 X |
| 3,774,403 | 11/1973 | Cushing | 405/157 X |
| 4,171,463 | 10/1979 | Watkins | 405/157 X |

FOREIGN PATENT DOCUMENTS 1558427  1/1980  United Kingdom ............... 405/157

Primary Examiner—David H. Corbin
Attorney, Agent, or Firm—Barnes, Kisselle, Raisch, Choate, Whittemore & Hulbert

[57] ABSTRACT

A method of protecting underground pipe from corrosion in a region in which it extends through a casing and is subject to the deleterious action of water accumulated in the casing. The ends of the casing are sealed to provide a closed chamber around the pipe. A treatment substance capable of mixing with the water and reducing or neutralizing its deleterious effect is introduced to the chamber. Thereafter a corrosion-resistant compound is pumped into the chamber to substantially fill the chamber with the compound and displace all or much of the water from the chamber.

11 Claims, 4 Drawing Figures

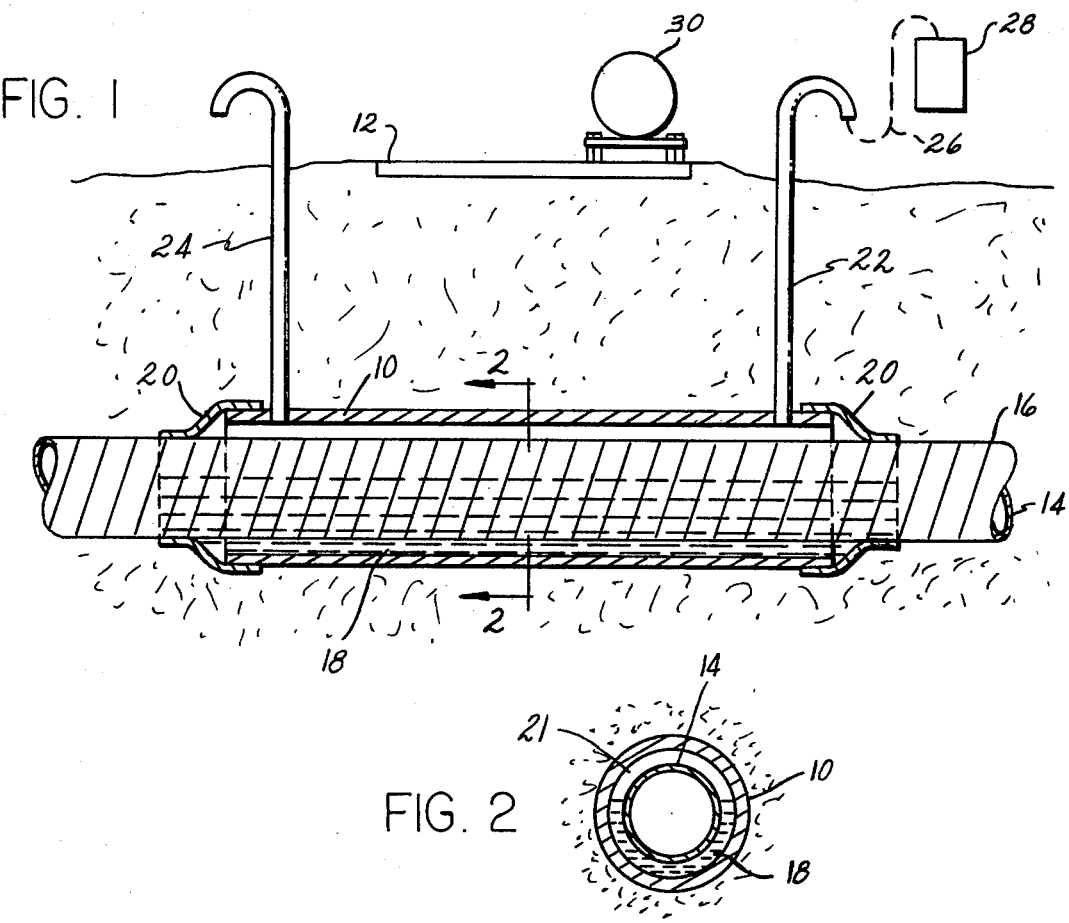
FIG. 1
FIG. 2
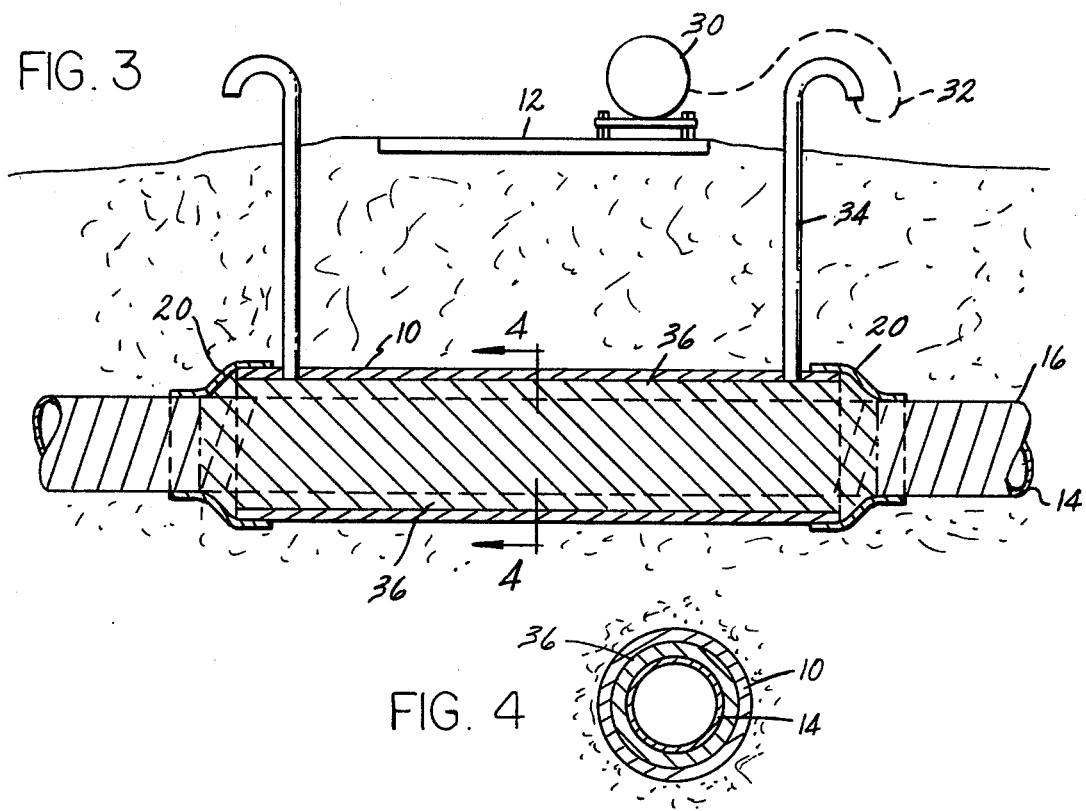
FIG. 3
FIG. 4

PROTECTIVE SYSTEM FOR UNDERGROUND PIPES

This invention relates to a method of protecting underground pipe from corrosion and refers more particularly to a method of protecting underground pipe in a region in which the pipe extends through a casing.

SUMMARY OF THE INVENTION

A casing is often provided for an underground pipe where it crosses under a road or railroad. Water collects in the casing and can facilitate corrosion of pipe inside the casing. Accordingly, it is a principal object of this invention to protect the pipe from the deleterious action of moisture that might have collected in the casing.

In accordance with the method of the present invention, the ends of the casing are at least partially sealed to provide a substantially closed chamber around the pipe, a treatment substance is introduced into the chamber which is capable of mixing with any accumulated water to reduce or neutralize its deleterious effect, and thereafter a corrosion-resistant compound is pumped into the chamber to substantially fill the chamber and simultaneously displace all or most of the water from the chamber. Any water not displaced by the corrosion-resistant compound has been substantially neutralized so as not to corrode or otherwise damage the pipe.

Other objects of the invention will become apparent as the following description proceeds, especially when considered in conjunction with the accompanying drawings.

BRIEF DESCRIPTION OF THE DRAWINGS

FIG. 1 is a side elevational view with parts in section showing a length of underground pipe extending through a casing before the corrosion-resistant compound has been introduced to the chamber surrounding the pipe.

FIG. 2 is a cross sectional view taken on the line 2—2 in FIG. 1.

FIG. 3 is similar to FIG. 1 but shows the pipe and casing after the corrosion-resistant compound has been pumped into the chamber.

FIG. 4 is a sectional view taken on the line 4—4 in FIG. 3.

DETAILED DESCRIPTION

Referring now more particularly to the drawings, the numeral 10 indicates an open-ended tubular casing which may be formed of any suitable material such, for example, as steel. The casing is shown underground, beneath a rod 12. A section of pipe extending within the casing is indicated at 14. The outside diameter of the pipe is considerably less than the inside diameter of the casing. The pipe is supported more or less concentrically within the casing as by casing spacers which may be of the type shown in either of my prior U.S. Pat. Nos. 2,890,724 and 3,022,085. Casing spacers are not shown in the drawings, however, since they form no part of the present invention.

In the usual case, the pipe has a protective covering 16 which may, for example, comprise a corrosion-resistant compound applied to the outer surface of the pipe and spirally over-wrapped with a suitable length of tape material. A protective covering of the type shown in prior U.S. Pat. No. 2,713,383 would be suitable for this purpose.

Water tends to accumulate in the casing as indicated at 18 in the drawing. This water, and any distructive or corrosive agents contained therein, may have a deleterious effect on the pipe in the event that it should be in contact with the pipe in the casing.

In accordance with the present invention, the ends of the casing are sealed by any suitable means such as by the boots 20. Boots 20 are generally cylindrical members which at one end engage the surface of the wrapped pipe and at the other end are stretched over and hug the end surfaces of the casing. The annular space between the wrapped pipe and the casing becomes a closed chamber 21 sealed at the ends by the boots 20.

Inlet and outlet tubes 22 and 24 to and from the chamber extend through opposite ends of the casing and terminate in open ends above the surface of the ground.

A suitable treatment substance in introduced into the chamber through the inlet 22 and line 26 from a container 28. This treatment substance is capable of mixing with the water in the chamber and reducing or neutralizing its deleterious effect. The treatment substance may include a corrosion inhibitor such, for example, as sodium nitrite, ammonimum nitrite, (amine salt alox 232), or organic sodium sulfonates like Penreco Co.'s 742, 745, etc.

The treatment substance may include triethanolamine, diethanolamine, morpholine, hydrazine or ammonia which provide a high pH value to create an alkaline environment.

The treatment substance may include hydrazine, ammonium nitrite, sodium nitrite or sulfite. These are oxygen scavengers which react with oxygen to eliminate it.

The treatment substance may include octa decyl amine acetate from Armac Co., or alox amine salt 232, etc., which are filming or suface coating amines.

The treatment substance may include Synkad 303 from Keil Chemical Co., or sodium sulfonates from Penreco Co., which are surfactants or wetting agents.

The treatment substance may include neofat 8 or morpholine neofat from Armak Co. which are vapor phase inhibitors.

The treatment substance may include alox amine-salt 232, Lonza and onyx quarteriary salts, Dowicil 72 Grotan or Givaudan materials which are bactericides.

The treatment substance may include any one or more of the foregoing materials.

After the treatment substance has been introduced into the chamber 21 and mixed with the water to reduce or neutralize its deleterious effect, a corrosion-resistant compound 36 is pumped into the chamber to substantially fill the chamber with the compound and displace all or much of the water from the chamber. As seen in FIG. 3, the corrosion-resistant compound is pumped from the truck 30 and line 32 through the inlet 22, filling the chamber 21. The chamber is shown in FIG. 3 filled with the compound 36. The compound is pumped into the chamber until it begins to flow out of the outlet 24 to indicate that the chamber is filled. In the process of filling the chamber with the compound, the treated water is forced out through the outlet 24 ahead of the compound and all or most of the treated water is displaced from the chamber in this manner. However, any water remaining in the chamber after the introduction of the corrosive-resistant compound 36 is rendered relatively harmless or neutralized by the treatment substance mixed therewith prior to the introduction of the corrosion-resistant compound.

The corrosion-resistant compound may, for example, be of the bituminous type or may be a petroleum type wax including rust inhibitors and wetting agents. Such waxes or petrolatums are well known in the trade, possessing excellent corrosion-resistant qualities. Petroleums available to the trade have a softening point in the neighborhood of 100°–130° F.

I claim:

1. In a method of protecting underground pipe from corrosion in a region in which the pipe extends through a casing in which water has collected and may be subject to the deleterious action of the collected water, including any destructive agents contained therein, comprising the steps of sealing the ends of the casing to provide a closed chamber around the pipe, and pumping a corrosion-resistant compound into said chamber to subtantially fill said chamber with said compound and simultaneously displace all or much of the water from said chamber, the improvement comprising introducing to said chamber, prior to pumping the corrosion-resistant compound thereinto, a treatment substance capable of mixing with the water and reducing or neutralizing its deleterious effect so that any water remaining in said chamber after the corrosion-resistant compound has been pumped into said chamber will be relatively harmless to the pipe.

2. A method as defined in claim 1, wherein an inlet to and an outlet from said chamber are provided to permit the introduction of said treatment substance and compound to said chamber and the displacement of the water from said chamber.

3. A method as defined in claim 1, wherein said compound is selected from the group consisting of petroleum type material and bituminous type material.

4. A method as defined in claim 1, wherein said treatment substance includes a corrosion inhibitor.

5. A method as defined in claim 1, wherein said treatment substance has a high pH to create an alkaline environment.

6. A method as defined in claim 1, wherein said treatment substance includes an oxygen scavenger.

7. A method as defined in claim 1, wherein said treatment substance contains a surface coating agent.

8. A method as defined in claim 1, wherein said treatment substance contains a surfactant.

9. A method as defined in claim 1, wherein said treatment substance includes a vapor phase inhibitor.

10. A method as defined in claim 1, wherein said treatment substance includes a bactericide.

11. In a method of protecting underground pipe from corrosion in a region in which the pipe extends through a casing in which water has collected and may be subject to the deleterious action of the collected water, including any destructive agents contained therein, comprising introducing a corrosion-resistant compount into the space within said casing around said pipe to substantially fill said space with said compound and simultaneously displace all or much of the water therefrom, the improvement comprising introducing to said space, prior to the introduction of said corrosion-resistant compound, a treatment substance capable of mixing with the collected water and reducing or neutralizing its deleterious effect so that any water remaining in said space after introduction of said corrosion-resistant compound will be relatively harmless to said pipe.

* * * * *